US012663924B2

(12) United States Patent
Peng

(10) Patent No.: US 12,663,924 B2
(45) Date of Patent: Jun. 23, 2026

(54) MEMORY CONTROLLER, MEMORY DEVICE AND MEMORY MANAGEMENT METHOD

(71) Applicant: Hefei Kaimeng Technology Co., Ltd., Anhui (CN)

(72) Inventor: Chong Peng, Anhui (CN)

(73) Assignee: Hefei Kaimeng Technology Co., Ltd., Anhui (CN)

( * ) Notice: Subject to any disclaimer, the term of this patent is extended or adjusted under 35 U.S.C. 154(b) by 35 days.

(21) Appl. No.: 19/023,395

(22) Filed: Jan. 16, 2025

(65) Prior Publication Data

US 2025/0383772 A1 Dec. 18, 2025

(30) Foreign Application Priority Data

Jun. 14, 2024 (CN) .......................... 202410764363.6

(51) Int. Cl.
*G06F 3/06* (2006.01)
(52) U.S. Cl.
CPC .......... *G06F 3/0611* (2013.01); *G06F 3/0635* (2013.01); *G06F 3/0659* (2013.01); *G06F 3/0679* (2013.01)
(58) Field of Classification Search
CPC .... G06F 3/0611; G06F 3/0659; G06F 3/0679; G06F 3/0635
See application file for complete search history.

(56) References Cited

U.S. PATENT DOCUMENTS

| 8,171,239 B2 * | 5/2012 | Yim | G06F 3/0613 |
| | | | 710/52 |
| 2016/0253091 A1 * | 9/2016 | Ayyavu | G06F 3/061 |
| | | | 711/103 |
| 2021/0133128 A1 * | 5/2021 | Jo | G06F 13/1673 |
| 2022/0206894 A1 * | 6/2022 | Li | G06F 12/0253 |

OTHER PUBLICATIONS

Zhang, Guangfei, et al. "Heterogeneous multi-channel: Fine-grained dram control for both system performance and power efficiency." Proceedings of the 49th Annual Design Automation Conference. 2012. (Year: 2012).*

* cited by examiner

*Primary Examiner* — Nicholas J Simonetti
(74) *Attorney, Agent, or Firm* — JCIPRNET

(57) ABSTRACT

A memory management method and a memory controller for executing virtual block mapping operations. The method performs initial virtual block mapping across multiple physical channels, then dynamically divides the channels into two groups when free blocks in a target channel fall below a threshold. By remapping blocks separately for each group, the method enables simultaneous garbage collection and host write operations across different channel groups, so as to improve operational efficiency of the storage device.

20 Claims, 11 Drawing Sheets

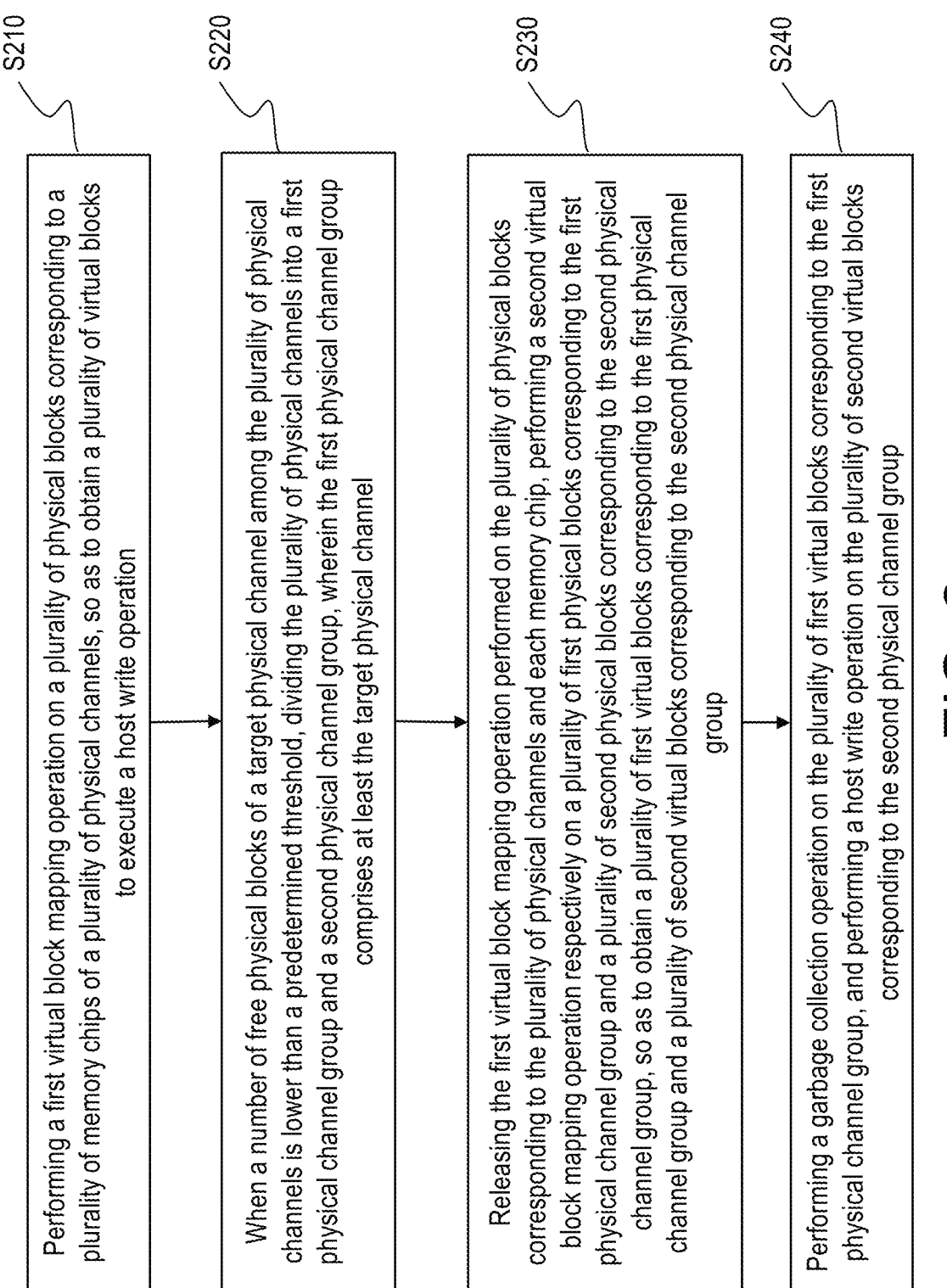

S210

Performing a first virtual block mapping operation on a plurality of physical blocks corresponding to a plurality of memory chips of a plurality of physical channels, so as to obtain a plurality of virtual blocks to execute a host write operation

S220

When a number of free physical blocks of a target physical channel among the plurality of physical channels is lower than a predetermined threshold, dividing the plurality of physical channels into a first physical channel group and a second physical channel group, wherein the first physical channel group comprises at least the target physical channel

S230

Releasing the first virtual block mapping operation performed on the plurality of physical blocks corresponding to the plurality of physical channels and each memory chip, performing a second virtual block mapping operation respectively on a plurality of first physical blocks corresponding to the first physical channel group and a plurality of second physical blocks corresponding to the second physical channel group, so as to obtain a plurality of first virtual blocks corresponding to the first physical channel group and a plurality of second virtual blocks corresponding to the second physical channel group

S240

Performing a garbage collection operation on the plurality of first virtual blocks corresponding to the first physical channel group, and performing a host write operation on the plurality of second virtual blocks corresponding to the second physical channel group

FIG. 2

Target Memory Chips

Virtual Block Mapping Operation

MEMORY CONTROLLER, MEMORY DEVICE AND MEMORY MANAGEMENT METHOD

CROSS-REFERENCE TO RELATED APPLICATION

This application claims the priority benefit of China application serial no. 202410764363.6, filed on Jun. 14, 2024. The entirety of the above-mentioned patent application is hereby incorporated by reference herein and made a part of this specification.

BACKGROUND

Technical Field

The present invention relates to a memory management technology, and more particularly to a memory controller for a storage device configured with a non-volatile memory and a memory management method used by the memory controller.

Description of Related Art

A non-volatile memory is a computer memory that retains stored data even when power is disconnected. The non-volatile memory has advantages of data non-volatility, power saving, small size and no mechanical structure, and is widely used in various electronic devices.

A common non-volatile memory is a memory configured with flash memory (such as a solid state drive), which has characteristics of high read and write speed and no mechanical structure for data access. In existing flash memory firmware design, the management of physical blocks is performed by binding all physical blocks with the same block number in the flash memory as a virtual block. This traditional virtual block management mode lacks flexibility and affects storage space utilization, and is no longer suitable.

SUMMARY

The purpose of the present invention is to solve the above problems by not only effectively binding physical blocks to obtain virtual blocks, but also performing partitioned binding to allow the storage device to execute normal write operations during garbage collection operations, thereby increasing the operational efficiency of the storage device.

One or more embodiments of the present invention provide a memory management method for a rewritable non-volatile memory module, wherein the rewritable non-volatile memory module comprises a plurality of physical channels respectively corresponding to a plurality of memory chips, wherein each of the memory chips comprises a plurality of physical blocks sequentially arranged according to a plurality of physical block numbers. The method comprises: performing a first virtual block mapping operation on the plurality of physical blocks corresponding to the plurality of memory chips of the plurality of physical channels, so as to obtain a plurality of virtual blocks to execute a host write operation; when a number of free physical blocks of a target physical channel among the plurality of physical channels is lower than a predetermined threshold, dividing the plurality of physical channels into a first physical channel group and a second physical channel group, wherein the first physical channel group comprises at least the target physical channel; and releasing the first virtual block mapping operation performed on the plurality of physical blocks corresponding to the plurality of physical channels and each memory chip, performing a second virtual block mapping operation respectively on a plurality of first physical blocks corresponding to the first physical channel group and a plurality of second physical blocks corresponding to the second physical channel group, so as to obtain a plurality of first virtual blocks corresponding to the first physical channel group and a plurality of second virtual blocks corresponding to the second physical channel group; and performing a garbage collection operation on the plurality of first virtual blocks corresponding to the first physical channel group, and performing a host write operation on the plurality of second virtual blocks corresponding to the second physical channel group.

In one or more embodiments of the present invention, performing the first virtual block mapping operation on the plurality of physical blocks corresponding to the plurality of memory chips of the plurality of physical channels comprises: performing a virtual block mapping operation on a plurality of first-type physical blocks among the plurality of physical blocks, wherein the plurality of first-type physical blocks are of a single-level cell type.

In one or more embodiments of the present invention, obtaining the plurality of virtual blocks to execute the host write operation comprises: selecting a target virtual block from the plurality of virtual blocks to store write data corresponding to a write command; and recording address mapping information according to a physical address of a target virtual page of the target virtual block and a logical address corresponding to the write data, wherein the write command indicates the logical address, and the write data is stored in the target virtual page.

In one or more embodiments of the present invention, performing the second virtual block mapping operation respectively on the plurality of first physical blocks corresponding to the first physical channel group and the plurality of second physical blocks corresponding to the second physical channel group comprises: performing a virtual block mapping operation on a plurality of second-type physical blocks among the plurality of first physical blocks corresponding to the first physical channel group, wherein the second-type physical blocks are of a X-level cell type; and performing a virtual block mapping operation on a plurality of first-type physical blocks among the plurality of second physical blocks corresponding to the second physical channel group, wherein the first-type physical blocks are of a single-level cell type.

In one or more embodiments of the present invention, during performing the garbage collection operation on the plurality of first physical blocks corresponding to the first physical channel group, if another write command is received, selecting a target second virtual block from the plurality of second virtual blocks to store another write data corresponding to the another write command; and recording address mapping information according to a physical address of a target second virtual page of the target second virtual block and a logical address corresponding to the another write data, wherein the write command indicates a logical address corresponding to the another write data, and the another write data is stored in the target second virtual page.

In one or more embodiments of the present invention, after completion of the garbage collection operation on the plurality of first physical blocks corresponding to the first physical channel group, the method further comprises:

restoring normal operation of the plurality of first physical blocks corresponding to the first physical channel group and performing another host write operation on the plurality of first virtual blocks of the first physical channel group; and performing another garbage collection operation on the plurality of second virtual blocks of the second physical channel group.

Wherein, after completion of the another garbage collection operation on the plurality of second physical blocks corresponding to the second physical channel group, restoring normal operation of the plurality of second physical blocks corresponding to the second physical channel group, releasing the second virtual block mapping operation, and restoring the first virtual block mapping operation.

In one or more embodiments of the present invention, performing the another host write operation on the plurality of first virtual blocks of the first physical channel group comprises: performing a virtual block mapping operation on first-type physical blocks corresponding to the first physical channel group, so as to obtain the plurality of first virtual blocks to execute the another host write operation, wherein the first-type physical blocks are of a single-level cell type. Performing the another garbage collection operation on the plurality of second virtual blocks of the second physical channel group comprises: performing a virtual block mapping operation on second-type physical blocks corresponding to the second physical channel group, so as to obtain the plurality of second virtual blocks to execute the another garbage collection operation, wherein the second-type physical blocks are of a X-level cell type.

In one or more embodiments of the present invention, the virtual block mapping operation comprises: grouping the plurality of physical blocks having same numbers into a same virtual block according to the plurality of physical channels and respective physical block numbers of each memory chip corresponding to the plurality of physical blocks; and grouping a plurality of physical pages having same numbers into a same virtual page of a corresponding virtual block according to respective physical page numbers of the plurality of physical pages of the plurality of physical blocks grouped into each virtual block.

In one or more embodiments of the present invention, during performing the first virtual block mapping operation on first-type physical blocks among the plurality of physical blocks, the method further comprises: selecting predetermined physical blocks respectively from each physical channel to perform a third virtual block mapping operation, so as to group a plurality of predetermined physical blocks into a plurality of predetermined virtual blocks, wherein the plurality of predetermined physical blocks are of a X-level cell type; and when executing a system data storage instruction sequence, selecting one or more target predetermined virtual blocks from the plurality of predetermined virtual blocks, and storing corresponding system data into the selected one or more target predetermined virtual blocks, wherein the system data is not user data from the host system.

In one or more embodiments of the present invention, each memory chip comprises a plurality of planes, the method further comprises: writing data to each virtual block via a multi-plane write mechanism, and reading data from each virtual block via a multi-plane read mechanism.

A memory controller, adapted for controlling a storage device configured with a rewritable non-volatile memory module. The memory controller comprises: a memory interface control circuit, electrically connected to the rewritable non-volatile memory module, wherein the rewritable non-volatile memory module comprises a plurality of physical channels respectively corresponding to a plurality of memory chips, wherein each of the memory chips comprises a plurality of physical blocks sequentially arranged according to physical block numbers; and a processor, electrically connected to the memory interface control circuit, wherein the processor is further electrically connected to a connection interface circuit of the storage device, so as to electrically connect to a host system. The processor is configured to: perform a first virtual block mapping operation on the plurality of physical blocks corresponding to the plurality of memory chips of the plurality of physical channels, so as to obtain a plurality of virtual blocks to execute a host write operation;

when a number of free physical blocks of a target physical channel among the plurality of physical channels is lower than a predetermined threshold, divide the plurality of physical channels into a first physical channel group and a second physical channel group, wherein the first physical channel group comprises at least the target physical channel; and release the first virtual block mapping operation performed on the plurality of physical blocks corresponding to the plurality of physical channels and each memory chip, perform a second virtual block mapping operation respectively on a plurality of first physical blocks corresponding to the first physical channel group and a plurality of second physical blocks corresponding to the second physical channel group, so as to obtain a plurality of first virtual blocks corresponding to the first physical channel group and a plurality of second virtual blocks corresponding to the second physical channel group; and perform a garbage collection operation on the plurality of first virtual blocks corresponding to the first physical channel group, and perform a host write operation on the plurality of second virtual blocks corresponding to the second physical channel group.

Based on the above, the memory controller, storage device and memory management method provided by the embodiments of the present invention can utilize grouping and binding of multiple physical blocks to obtain multiple groups of virtual blocks, allowing the storage device to simultaneously perform garbage collection operations and host user data write operations by groups, avoiding the drawback of traditional garbage collection operations having to avoid host user data write operations, improving the flexibility and efficiency of garbage collection operations, thereby enhancing the operational efficiency of the storage device and improving user experience.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2 is a flowchart illustrating a memory management method according to an embodiment of the present invention;

FIG. 5 is a diagram illustrating the establishment of virtual blocks and virtual pages according to an embodiment of the present invention;

FIG. 6 is a diagram illustrating the establishment of virtual blocks and virtual pages according to another embodiment of the present invention;

FIG. 11 is a diagram illustrating performing virtual block mapping operations respectively based on system data storage requirements according to an embodiment of the present invention.

DESCRIPTION OF THE EMBODIMENTS

Figure 1:
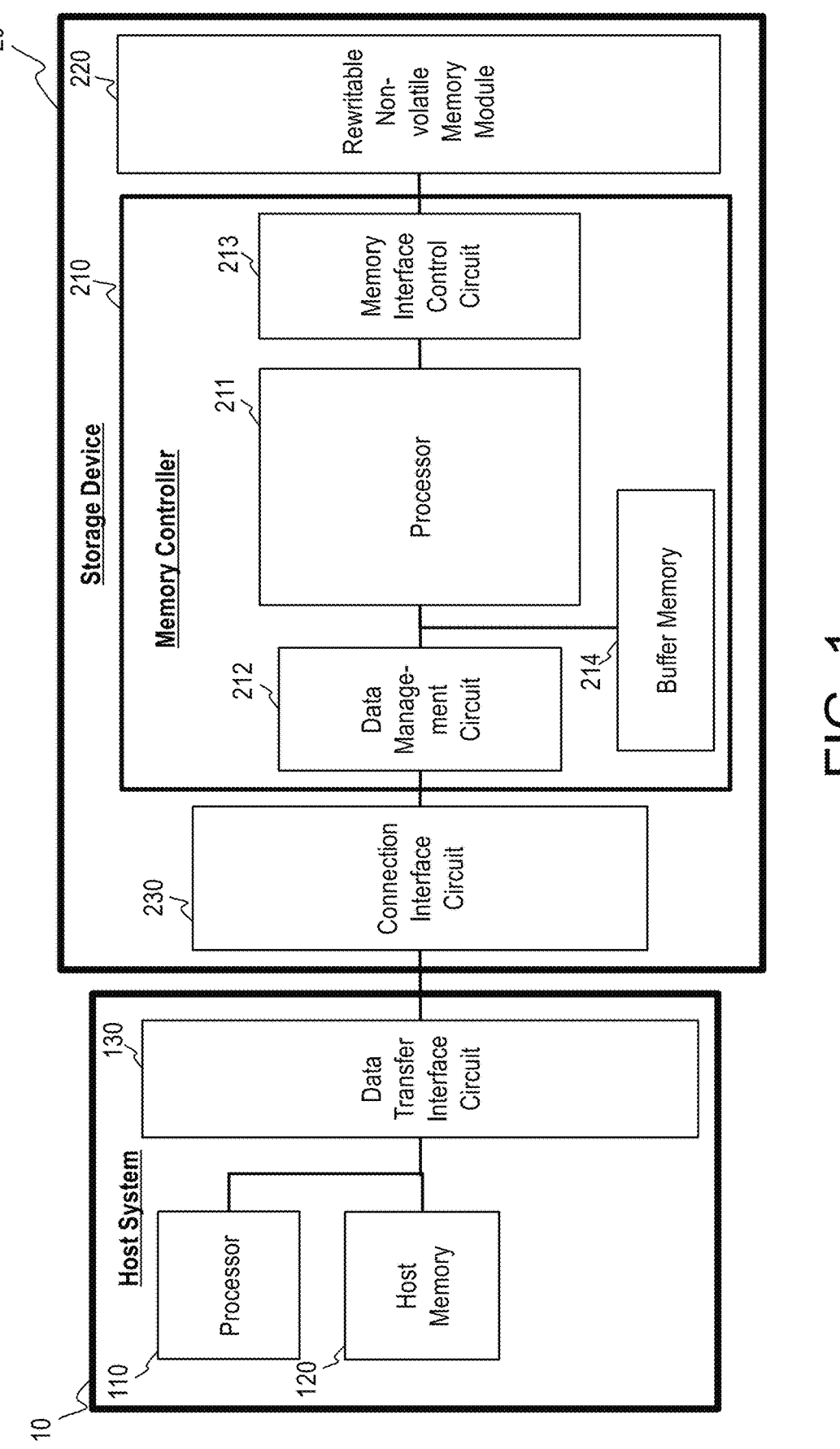
FIG. 1 is a block diagram illustrating a host system and a storage device according to an embodiment of the present invention.

Reference will now be made in detail to exemplary embodiments of the invention, examples of which are illustrated in the accompanying drawings. Wherever possible, the same reference numbers are used in the drawings and the description to refer to the same or like parts.

Please refer to FIG. 1, which is a block diagram illustrating a host system and a storage device according to an embodiment of the present invention. The host system 10 may be a personal computer, notebook computer, or server. The host system 10 includes a processor 110 (also referred to as a second processor), a host memory 120, and a data transfer interface circuit 130. In this embodiment, the processor 110 is coupled (also referred to as electrically connected) to the host memory 120 and the data transfer interface circuit 130. In another embodiment, the processor 110, host memory 120, and data transfer interface circuit 130 are electrically connected to each other through a system bus. In this embodiment, the processor 110, host memory 120, and data transfer interface circuit 130 may be disposed on a motherboard of the host system 10.

The storage device 20 includes a memory controller 210, a rewritable non-volatile memory module 220, and a connection interface circuit 230. The memory controller 210 includes a processor 211 (also referred to as a first processor), a data management circuit 212, and a memory interface control circuit 213.

In this embodiment, the host system 10 is electrically connected to the storage device 20 through the data transfer interface circuit 130 and the connection interface circuit 230 of the storage device 20 to perform data access operations. For example, the host system 10 may store data to the storage device 20 or read data from the storage device 20 through the data transfer interface circuit 130.

In this embodiment, the number of data transfer interface circuits 130 may be one or more. Through the data transfer interface circuit 130, the motherboard may be electrically connected to the storage device 20 via wired or wireless means. The storage device 20 may be, for example, a USB flash drive, memory card, solid state drive (SSD) or wireless memory storage device. The wireless memory storage device may be, for example, a near field communication (NFC) memory storage device, WiFi memory storage device, Bluetooth memory storage device or low power Bluetooth memory storage device (e.g., iBeacon) or other memory storage devices based on various wireless communication technologies. Furthermore, the motherboard may also be electrically connected through the system bus to a Global Positioning System (GPS) module, network interface card, wireless transmission device, keyboard, screen, speaker, or various I/O devices.

In this embodiment, the data transfer interface circuit 130 and the connection interface circuit 230 are interface circuits compatible with the Peripheral Component Interconnect Express (PCI Express) standard. Moreover, data transmission between the data transfer interface circuit 130 and the connection interface circuit 230 is performed using the Non-Volatile Memory express (NVMe) communication protocol.

Furthermore, in another embodiment, the connection interface circuit 230 may be packaged in a chip with the memory controller 210, or the connection interface circuit 230 may be disposed outside a chip containing the memory controller 210.

In this embodiment, the host memory 120 is used to temporarily store instructions or data executed by the processor 110. For example, in this embodiment, the host memory 120 may be a Dynamic Random Access Memory (DRAM), Static Random Access Memory (SRAM), or other suitable memory. However, it should be understood that the present invention is not limited to this, and the host memory 120 may be other suitable types of memory.

The memory controller 210 is configured to execute multiple logic gates or control instructions implemented in hardware form or firmware form and to perform data write, read, and erase operations in the rewritable non-volatile memory module 220 according to instructions from the host system 10.

More specifically, the processor 211 in the memory controller 210 is hardware with computational capabilities, used to control the overall operation of the memory controller 210. Specifically, the processor 211 is programmed by multiple control instructions/program codes, and when the storage device 20 is operating, these control instructions/program codes are executed to perform data write, read, and erase operations. Moreover, in this embodiment, these control instructions/program codes can also be executed to perform data read operations to implement the data read method provided by the present invention. The control instructions/program codes corresponding to the data read method can also be implemented as hardware circuit units to implement the data read method provided by the present invention.

It is worth mentioning that in this embodiment, the processor 110 and processor 211 may be, for example, a Central Processing Unit (CPU), micro-processor, or other programmable processing units, Digital Signal Processor (DSP), programmable controller, Application Specific Integrated Circuits (ASIC), Programmable Logic Device (PLD) or other similar circuit components. The present invention is not limited to these.

In this embodiment, as mentioned above, the memory controller 210 also includes the data management circuit 212 and the memory interface control circuit 213. It should be noted that operations executed by each component of the memory controller 210 can also be considered as operations executed by the memory controller 210.

Wherein, the data management circuit 212 is electrically connected to the processor 211, the memory interface control circuit 213, and the connection interface circuit 230. The data management circuit 212 is used to receive instructions from the processor 211 to perform data transfer. For example, reading data from the host system 10 (e.g., host memory 120) through the connection interface circuit 230, and writing the read data to the rewritable non-volatile memory module 220 through the memory interface control circuit 213 (e.g., performing a write operation according to a write command from the host system 10). Alternatively, reading data from one or more physical units of the rewritable non-volatile memory module 220 (data can be read from one or more memory cells in one or more physical units) through the memory interface control circuit 213, and writing the read data to the host system 10 (e.g., host memory 120) through the connection interface circuit 230 (e.g., performing a read operation according to a read command from the host system 10). In another embodiment, the data management circuit 212 may also be integrated into the processor 211.

The memory interface control circuit 213 is used to receive instructions from the processor 211 and cooperate with the data management circuit 212 to perform write (also referred to as programming) operations, read operations, or erase operations on the rewritable non-volatile memory module 220.

Furthermore, data to be written to the rewritable non-volatile memory module 220 is converted through the memory interface control circuit 213 into a format acceptable by the rewritable non-volatile memory module 220. Specifically, if the processor 211 needs to access the rewritable non-volatile memory module 220, the processor 211 will transmit corresponding instruction sequences to the memory interface control circuit 213 to instruct the memory interface control circuit 213 to execute corresponding operations. For example, these instruction sequences may include write instruction sequences for indicating write data, read instruction sequences for indicating read data, erase instruction sequences for indicating erase data, and corresponding instruction sequences for indicating various memory operations. These instruction sequences may include one or more signals, or data on the bus. These signals or data may include instruction codes or program codes. For example, in a read instruction sequence, it will include read identification codes, memory addresses, physical addresses, and other information.

Furthermore, the memory controller 210 will establish a logical-to-physical address mapping table and a physical-to-logical address mapping table to record the mapping relationships between logical units (such as logical blocks, logical pages, or logical columns) and physical units (such as physical erase units/physical blocks, physical pages, physical columns) configured for the rewritable non-volatile memory module 220. In other words, the memory controller 210 can use the logical-to-physical address mapping table (also referred to as the logical-to-physical mapping table) to find a physical unit mapped by a logical unit (e.g., find a physical page mapped by a logical page; find a physical address mapped by a logical address), and the memory controller 210 can use the physical-to-logical address mapping table (also referred to as the physical-to-logical mapping table) to find a logical unit mapped by a physical unit (e.g., find a logical page mapped by a physical page; find a logical address mapped by a physical address).

In one embodiment, the memory controller 210 also includes a buffer memory 214. The buffer memory 214 is electrically connected to the processor 211 and is used to temporarily store data and instructions from the host system 10, data from the rewritable non-volatile memory module 220, or other system data (such as various mapping tables, index tables, address lists) used to manage the storage device 20, allowing the processor 211 to quickly access the data, instructions, or system data from the buffer memory 214.

The rewritable non-volatile memory module 220 is electrically connected to the memory controller 210 (memory interface control circuit 213) and is used to store data written by the host system 10.

In this embodiment, the rewritable non-volatile memory module 220 has multiple word lines, wherein each of the word lines is electrically connected to multiple memory cells, also referred to as columns (also referred to as physical columns). Multiple columns on the same word line form a physical programming unit (also referred to as a physical page). Each physical page corresponds to a physical address, used to record the location of data stored in the physical page. Furthermore, multiple physical pages may form a physical block (also referred to as a physical erase unit). Each memory chip (chip) in the multiple memory chips of the rewritable non-volatile memory module has multiple planes, and each plane has multiple physical blocks.

In this embodiment, each memory cell can store 1 or multiple bits of data. Memory cells that store 1 bit are of the Single-Level Cell (SLC) type, while memory cells that store multiple bits (also simply referred to as XLC) can be further categorized into Multi-Level Cell (MLC) storing 2 bits, Triple-Level Cell (TLC) storing 3 bits, Quad-Level Cell (QLC) storing 4 bits, and Penta-Level Cell (PLC) storing 5 bits. SLC is characterized by faster storage speed and better stability, while XLC features larger storage space but slower speed and less stability. All memory cells in a physical block belong to the same type. For example, a single-level cell physical block has all its memory cells of the single-level cell type, and a triple-level cell physical block has all its memory cells of the triple-level cell type.

It should be noted that the present invention does not limit the size of each physical page and logical page.

FIG. 2 is a flowchart illustrating a memory management method according to an embodiment of the present invention. FIG. 2 is a flowchart illustrating a memory management method according to an embodiment of the present invention.

Please refer to FIG. 2. In step S210, the memory controller 210 (processor 211) performs a first virtual block mapping operation on the plurality of physical blocks corresponding to the plurality of memory chips of the plurality of physical channels, so as to obtain a plurality of virtual blocks to execute a host write operation.

In one embodiment, the memory controller 210 identifies multiple physical channels of the rewritable non-volatile memory module, multiple chip enable pins corresponding to each physical channel, and target memory chips corresponding to each chip enable pin. Here, target memory chips are the memory chips on which virtual block mapping operations are to be performed.

Channel (Channel, CH) pins (also referred to as physical channels) are a group of physical pins in the rewritable non-volatile memory module 220 that are responsible for receiving and transmitting data and commands.

Chip enable (Chip enable, CE) pins are used to select or deselect memory chips. Each CE pin corresponds to a physical chip (memory chip). If a chip enable pin is in an active state, the corresponding physical chip is selected.

The target memory chips corresponding to each chip enable pin include multiple physical blocks sequentially arranged according to multiple physical block numbers, wherein the multiple physical block numbers for each target memory chip are the same sequence of multiple numbers, and each physical block includes multiple physical pages sequentially arranged according to multiple physical page numbers.

Figure 3:
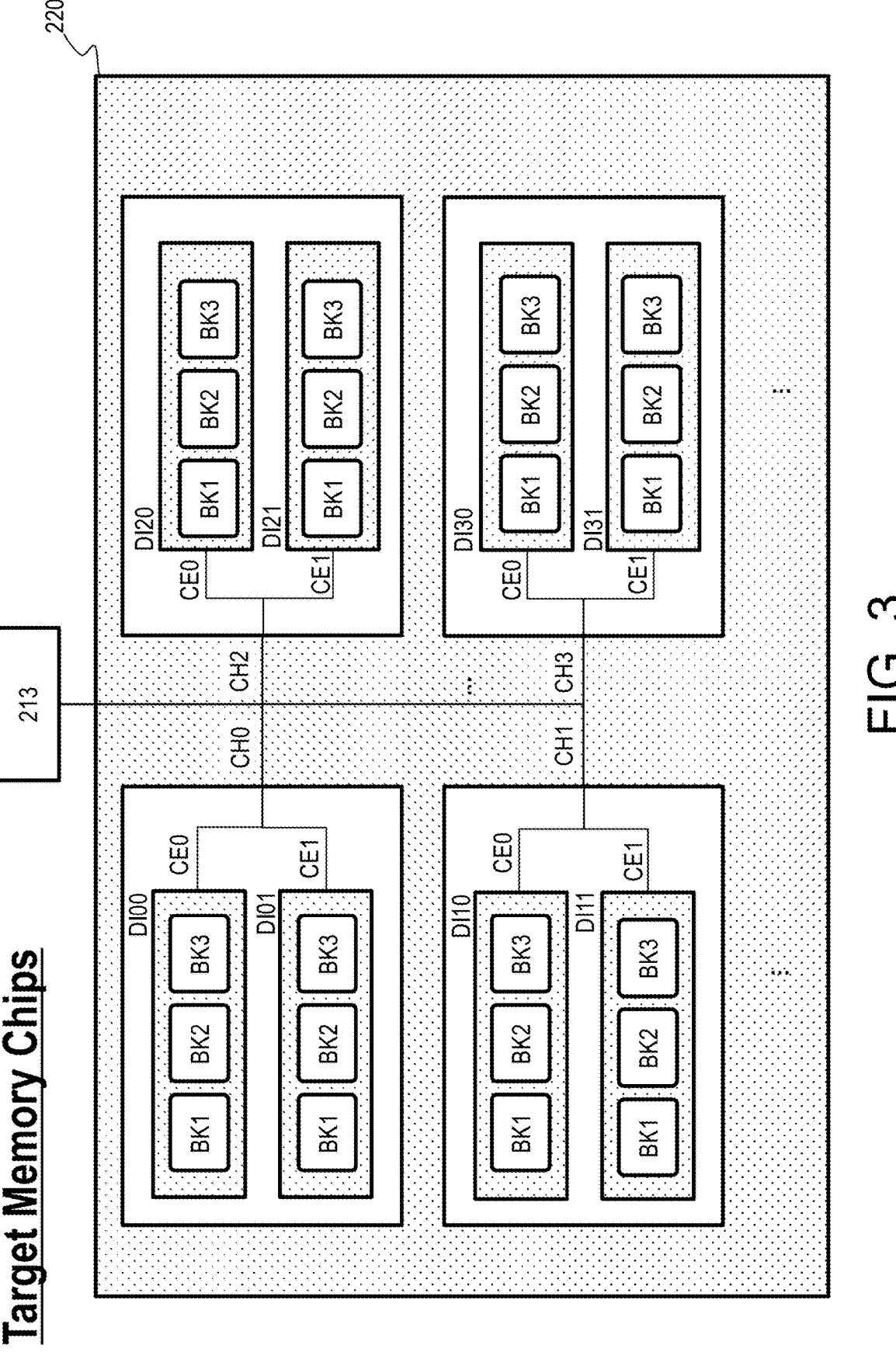
FIG. 3 is an architecture diagram illustrating memory chips according to an embodiment of the present invention.

FIG. 3 is an architecture diagram illustrating memory chips according to an embodiment of the present invention. For example, please refer to FIG. 3, the memory interface control circuit 213 is electrically connected to multiple memory chips DI00-DI31 through multiple physical channels CH0-CH3. Each physical channel corresponds to two chip enable pins. For example, physical channel CH0 corresponds to two chip enable pins CE0, CE1.

Furthermore, each memory chip can be enabled by triggering its corresponding chip enable pin. For example, when the CE pin corresponding to memory chip DI00 is selected/triggered, memory chip DI00 will be in an enabled state and can store/read data.

In this embodiment, each memory chip may have multiple physical blocks. For example, each memory chip has three physical blocks BK1-BK3. In one embodiment, each memory chip has two (or more) planes, and each plane has multiple physical blocks.

Furthermore, different CE pins corresponding to the same physical channel cannot be selected simultaneously and can only use an interleaving mechanism to improve efficiency. Physical blocks with the same physical block number in different planes under the same CE can perform parallel access (write/read), but the limitation is that the physical block numbers of the physical blocks being accessed in parallel need to be the same.

In this embodiment, multiple physical channels CH0-CH3 of the rewritable non-volatile memory module 220 are electrically connected to multiple memory chips DI00-DI31.

It should be noted that the quantity and configuration of each component in the above architecture are exemplary only, used for convenience of explanation, and do not limit the present invention. For example, each memory chip may have more than three physical blocks. Each physical channel may correspond to 4 or more chip enable pins.

In one embodiment, the virtual block mapping operation includes: grouping multiple physical blocks having the same physical block number into the same virtual block according to the multiple physical channels and respective physical block numbers of the multiple physical blocks corresponding to each memory chip; and grouping multiple physical pages having the same physical page number into the same virtual page of the corresponding virtual block according to respective physical page numbers of multiple physical pages of the physical blocks grouped into each virtual block.

In one embodiment, the memory controller 210 groups the multiple physical blocks into the multiple virtual blocks according to the multiple physical channels, the multiple chip enable pins, and respective physical block numbers of the multiple physical blocks corresponding to each target memory chip, wherein the number of virtual blocks is less than the number of physical blocks, and multiple physical blocks grouped into the same virtual block have the same physical block number. In other words, it can be viewed as binding all physical blocks with the same number from all CE pins of all CH pins into one virtual block.

In addition to binding all physical blocks with the same number into one virtual block, the memory controller 210 regroups multiple physical pages of the multiple physical blocks grouped into each virtual block into multiple virtual pages of the corresponding virtual block according to respective physical page numbers, wherein the number of virtual pages is less than the number of first physical pages, and multiple physical pages grouped into the same virtual page have the same physical page number.

In some embodiments, the memory controller 210 performs virtual block mapping operation on first-type physical blocks among the multiple physical blocks corresponding to the multiple memory chips of the multiple physical channels, wherein the first-type physical blocks are of single-level cell (SLC) type. After the virtual block mapping to obtain first-type virtual blocks for host write operations, when the memory is in an idle state, data in the first-type physical blocks that compose the first-type virtual blocks is moved to second-type physical blocks, wherein the second-type physical blocks are of X-level cell (XLC) type.

On one hand, since SLC has faster write speed, using SLC-type blocks for host write operations can improve write speed. On the other hand, when binding into virtual blocks to further increase write speed, because SLC blocks have smaller sizes, storage space utilization can be maintained while reducing storage resource waste that might be caused by large block sizes during virtual block binding write operations.

Furthermore, when performing virtual block mapping operations and obtaining multiple virtual blocks by binding multiple physical blocks, data can be written through the implementation of multiple CH and multiple CE parallel writing, which is faster than single-line writing.

Particularly, in the first virtual block mapping operation, binding is specifically performed on multiple SLC-type physical blocks. Based on SLC's inherently faster write speed compared to XLC, using parallel writing through bound SLC-type physical blocks will make host write operations even faster than non-parallel writing, or faster than using XLC for parallel writing.

In flash memory, the minimum write unit is a page. If using XLC for parallel writing, because the storage pages are too large while data is divided into small blocks for parallel processing, each small block of data might not reach one page size. To satisfy the minimum write unit requirement, invalid data needs to be filled to reach the storage page size before writing, which leads to waste of large amounts of storage page space.

Figure 4:
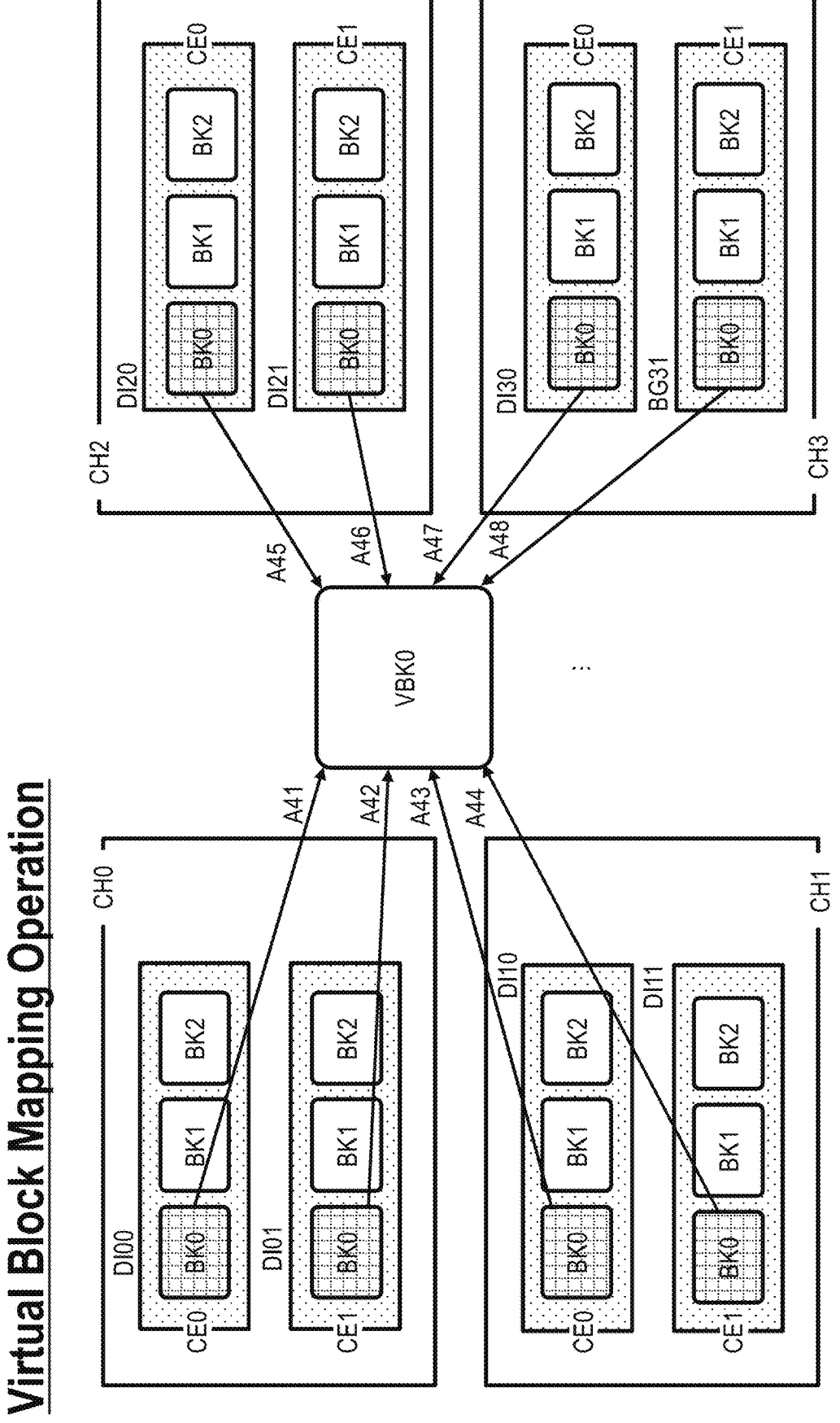
FIG. 4 is a diagram illustrating a virtual block mapping operation according to an embodiment of the present invention.

FIG. 4 is a diagram illustrating a virtual block mapping operation according to an embodiment of the present invention. For example, please refer to FIG. 4. In this embodiment, first, the memory controller 210 selects multiple physical blocks BK0 with the same physical block number from target memory chips corresponding to CH pins (i.e., physical channels) CH0-CH3 and CE pins CE0-CE1, and groups/sets them as virtual block VBK0.

For example, as shown by arrow A41, the memory controller 210 selects the first physical block BK0 from target memory chip DI00 corresponding to CH pin CH0 and CE pin CE0 to group into virtual block VBK0. Then, as shown by arrows A42-A48, the memory controller 210 respectively selects physical blocks BK0 of the same sequence (same physical block number) from target memory chips DI01-DI31 to group into virtual block VBK0.

In one embodiment, when the number of physical channels is X and the number of chip enable pins corresponding to each physical channel is Y, the number of physical blocks grouped into each virtual block is XY, and the number of physical pages in each virtual page is XY. For example, in the example of FIG. 4, the number of CH pins (X) is 4, and the number of chip enable pins corresponding to each physical channel (Y) is 2. In this case, the number of physical blocks BK0 grouped into virtual block VBK0 is 8 (XY=42=8). Furthermore, the number of physical pages grouped into a virtual page of each virtual block is also 8 (XY=42=8).

Furthermore, the virtual block number of each virtual block equals the physical block number of the multiple physical blocks owned by each virtual block, and the multiple virtual blocks of the target memory chips are sorted according to their respective virtual block numbers.

After obtaining virtual block VBK0, similarly, the memory controller 210 selects the next physical block from target memory chips DI00~DI31 corresponding to CH pin CH0 and CE pin CE0 to obtain the next virtual block.

Moreover, the multiple physical pages of multiple physical blocks BK0 grouped into virtual block VBK0 will be arranged according to a specific method to form multiple virtual pages of virtual block VBK0.

Figure 5:
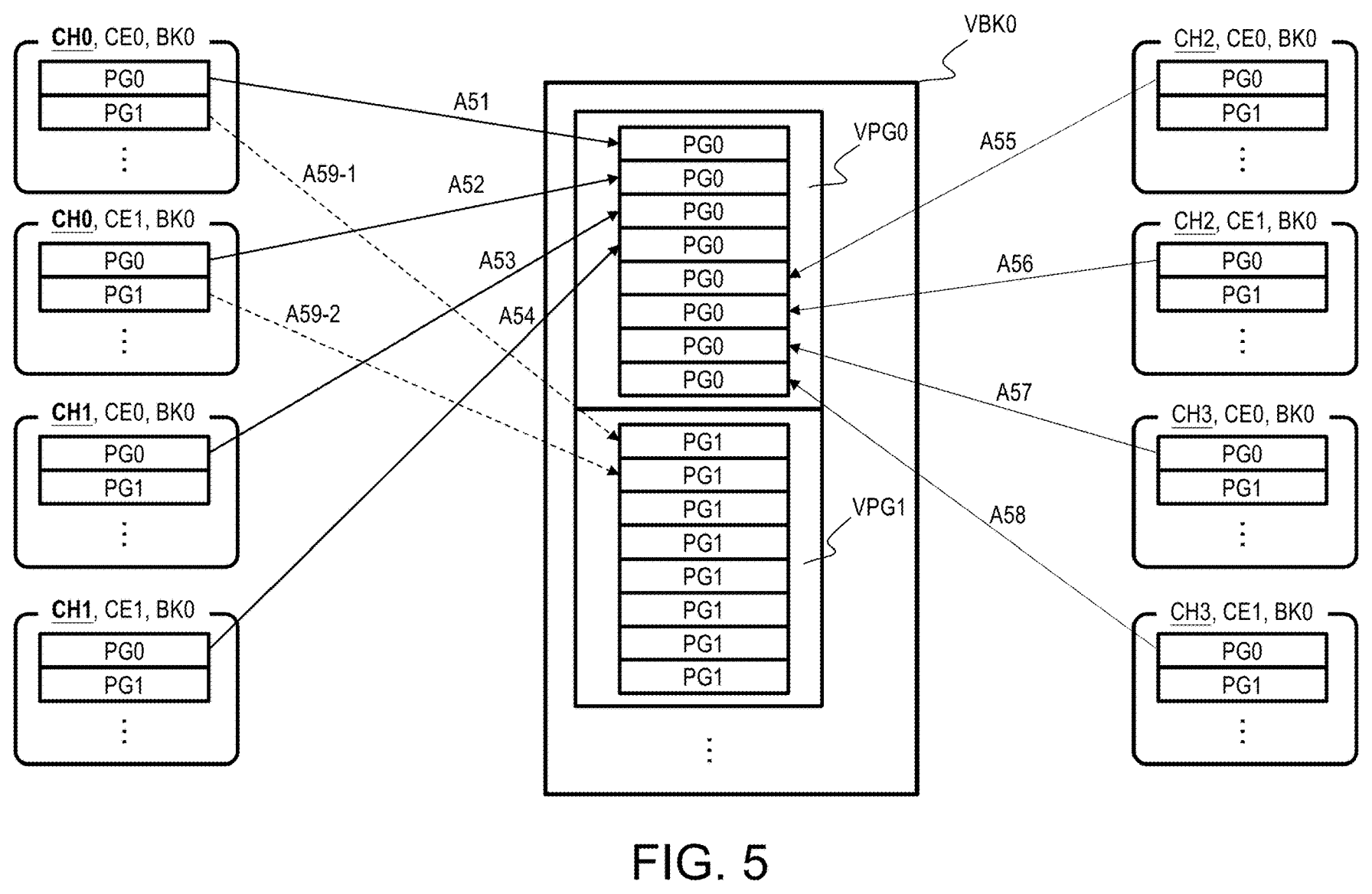

FIG. 5 is a diagram illustrating the establishment of virtual blocks and virtual pages according to an embodiment of the present invention. For example, please refer to FIG. 5, "CH0,CE0,BK0" represents physical block BK0 corresponding to CH pin CH0 and CE pin CE0. Assume each physical block includes multiple physical pages PG0, PG1, . . . .

As shown in FIG. 5, virtual block VBK0 includes physical pages PG0, PG1, . . . from 8 physical blocks: "CH0,CE0, BK0", "CH0,CE1,BK0", "CH1,CE0,BK0", "CH1,CE1, BK0", "CH2,CE0,BK0", "CH2,CE1,BK0", "CH3,CE0, BK0", "CH3,CE1,BK0". These physical pages form virtual pages VPG0, VPG1, . . . of virtual block VBK0 (e.g., virtual page VPG0 contains 8 physical pages PG0, virtual page VPG0 contains 8 physical pages PG1).

In one embodiment, the virtual page number of each virtual page equals the physical page number of the multiple physical pages owned by each virtual page. For example, the virtual page number/sequence of virtual page VPG0 equals the physical page number/sequence of its owned physical pages PG0 within their respective physical blocks. Furthermore, multiple virtual pages within each virtual block are sorted according to their respective virtual page numbers (e.g., sorted in the order of VPG0, VPG1, . . . ).

In this embodiment, the memory controller 210 first sorts multiple physical pages having the same physical page number of each virtual page according to corresponding physical channel numbers, then according to corresponding chip enable pin numbers. The above sorting order can also be viewed as the order of grouping multiple physical pages PG0, PG1, . . . of multiple physical blocks BK0 into multiple virtual pages VPG0, VPG1, . . . of virtual block VBK0.

Since sorting/grouping is first performed according to corresponding physical channel numbers, the memory controller 210 will first sort/group in the order of CH pins CH0~CH3, then in the order of CE pins CH0, CH1 within each CH pin. For example, to form virtual page VPG0, as shown by arrow A51, the memory controller 210 first selects physical page PG0 from physical block BK0 corresponding to CH0, CE0 to group into virtual page VPG0; then, as shown by arrow A52, selects physical page PG0 from physical block BK0 corresponding to CH0, CE1 to group into virtual page VPG0; then, as shown by arrow A53, selects physical page PG0 from physical block BK0 corresponding to CH1, CE0 to group into virtual page VPG0; then, as shown by arrow A54, selects physical page PG0 from physical block BK0 corresponding to CH1, CE1 to group into virtual page VPG0; then, as shown by arrow A55, selects physical page PG0 from physical block BK0 corresponding to CH2, CE0 to group into virtual page VPG0; then, as shown by arrow A56, selects physical page PG0 from physical block BK0 corresponding to CH2, CE1 to group into virtual page VPG0; then, as shown by arrow A57, selects physical page PG0 from physical block BK0 corresponding to CH3, CE0 to group into virtual page VPG0; then, as shown by arrow A58, selects physical page PG0 from physical block BK0 corresponding to CH0, CE1 to group into virtual page VPG0.

Similarly, the memory controller 210 obtains the next virtual page VPG1. For example, as shown by arrows A59-1, A59-2, the memory controller 210 will still first select the next physical page PG1 from physical channel CH0 to group into virtual page VPG1.

Figure 6:
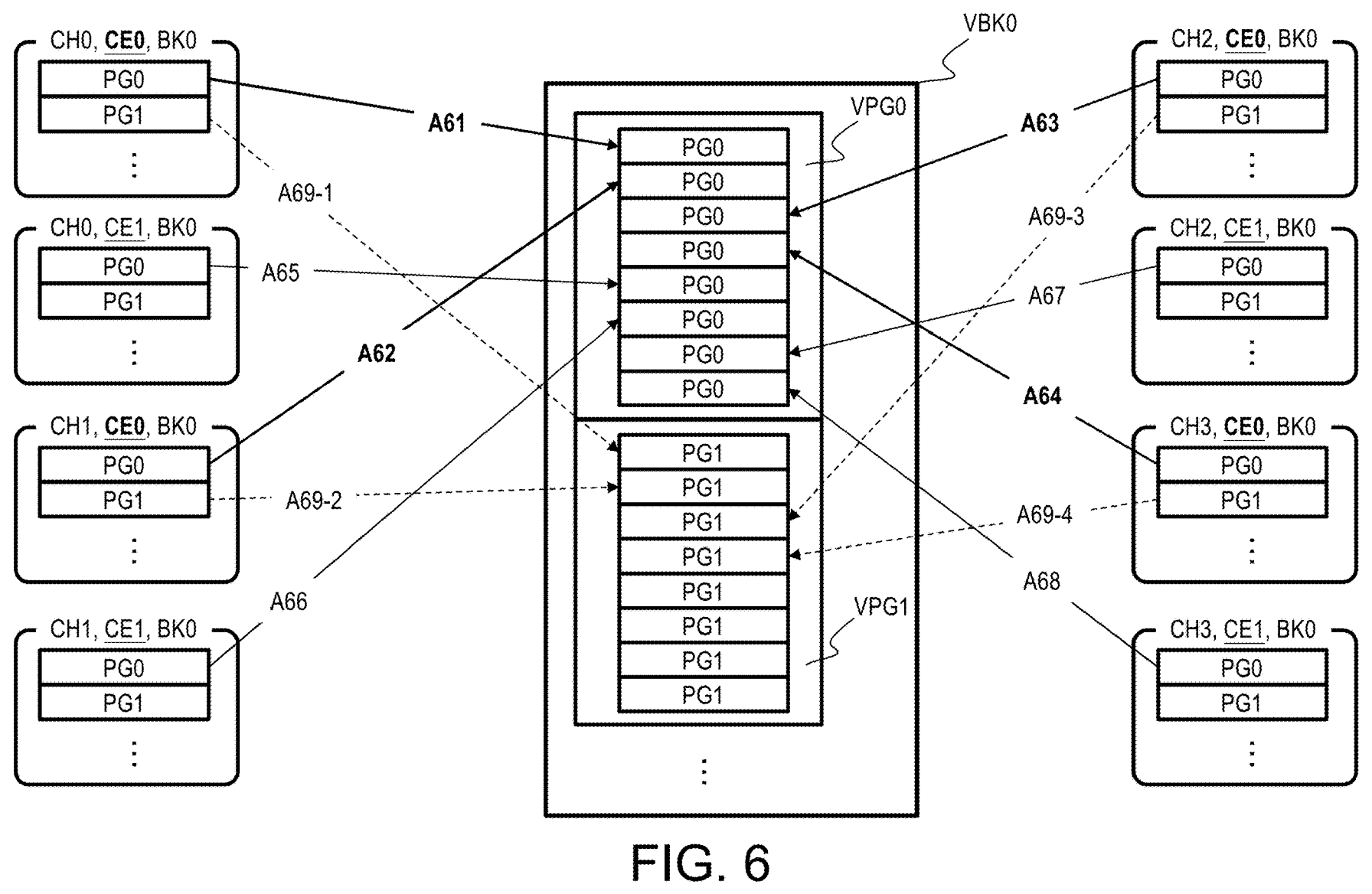

FIG. 6 is a diagram illustrating the establishment of virtual blocks and virtual pages according to another embodiment of the present invention. Please refer to FIG. 6. In this embodiment, the memory controller 210 first sorts multiple physical pages having the same physical page number of each virtual page according to corresponding chip enable pin numbers, then according to corresponding physical channel numbers.

Since sorting/grouping is first performed according to corresponding chip enable pin numbers, the memory controller 210 will first sort/group in the order of CE pins CH0, CE1, then in the order of corresponding multiple CH pins CH0~CH3. For example, to form virtual page VPG0, as shown by arrow A61, the memory controller 210 first selects physical page PG0 from physical block BK0 corresponding to CH0, CE0 to group into virtual page VPG0; then, as shown by arrow A62, selects physical page PG0 from physical block BK0 corresponding to CH1, CE0 to group into virtual page VPG0; then, as shown by arrow A63, selects physical page PG0 from physical block BK0 corresponding to CH2, CE0 to group into virtual page VPG0; then, as shown by arrow A64, selects physical page PG0 from physical block BK0 corresponding to CH3, CE0 to group into virtual page VPG0. Then, as shown by arrow A65, selects physical page PG0 from physical block BK0 corresponding to CH0, CE1 to group into virtual page VPG0; then, as shown by arrow A66, selects physical page PG0 from physical block BK0 corresponding to CH1, CE1 to group into virtual page VPG0; then, as shown by arrow A67, selects physical page PG0 from physical block BK0 corresponding to CH2, CE1 to group into virtual page VPG0; then, as shown by arrow A68, selects physical page PG0 from physical block BK0 corresponding to CH3, CE1 to group into virtual page VPG0.

Similarly, the memory controller 210 obtains the next virtual page VPG1. For example, as shown by arrows A69-1, A69-2, A69-3, A69-4, the memory controller 210 will still first select the next physical page PG1 from CE pin CE0 to group into virtual page VPG1.

In one embodiment, the memory controller 210 writes data to each virtual physical block via a multi-plane write mechanism and reads data from each virtual physical block via a multi-plane read mechanism. For example, through a multi-plane write operation, the memory controller 210 can write data of 4 physical pages in size to the first, third, fifth, and seventh physical pages PG0 in virtual page VPG0 shown in FIG. 5. These physical pages respectively correspond to different CH pins but the same CE pin CE0, thereby accelerating the write operation speed and improving efficiency.

For another example, through a multi-plane write operation, the memory controller 210 can write data of 4 physical pages in size to the first to fourth physical pages PG0 in virtual page VPG0 shown in FIG. 6, where these physical pages correspond to different CH pins but the same CE pin CE0. In this case, the order in which the memory controller 210 writes data to the physical pages PG0 of virtual page VPG0 can be both sequential and utilizing the multi-plane write mechanism, thereby achieving high write speed while maintaining efficient storage space utilization.

In one embodiment, obtaining the plurality of virtual blocks to execute the host write operation comprises: selecting one or more target virtual blocks from the plurality of virtual blocks to store write data corresponding to a write command; and recording address mapping information according to physical addresses of one or more target virtual pages of the target virtual block and logical addresses corresponding to the write data, wherein the write command indicates the logical address, and the write data is stored in the one or more target virtual pages. The following will use FIGS. 7~9 to explain methods for recording various types of address mapping information.

Figure 7:
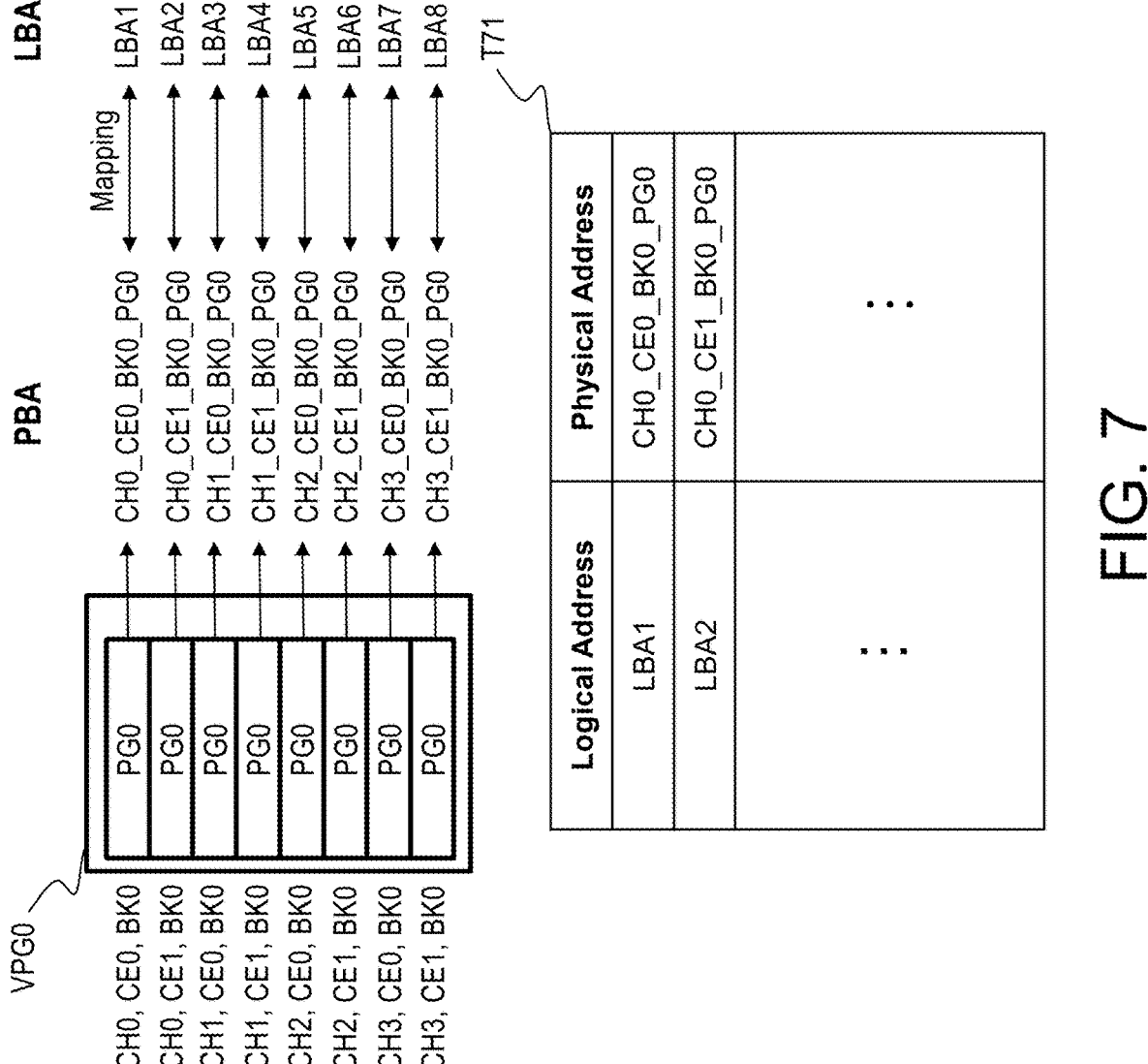
FIG. 7 is a diagram illustrating updating a logical-to-physical mapping table according to virtual blocks according to an embodiment of the present invention.

FIG. 7 is a diagram illustrating updating a logical-to-physical mapping table according to virtual blocks according to an embodiment of the present invention. Please refer to FIG. 7. In this embodiment, assume write data has been stored in virtual page VPG0, logical addresses (indices) corresponding to the write data are LBA1, LBA2-LBA8, and physical addresses (indices) of physical pages storing corresponding write data are "CH0_CE0_BK0_PG0" (e.g., corresponding to physical page PG0 of physical block BK0 corresponding to physical channel CH0 and chip enable pin CE0), "CH0_CE1_BK0_PG0"-"CH3_CE1_BK0_PG0". It should be noted that the logical addresses (indices) (e.g., logical address "LBA1") and physical addresses (indices) (e.g., physical address "CH0_CE0_BK0_PG0") used in this disclosure are designed for convenience of explanation and do not limit the specific value content of logical addresses or physical addresses in this disclosure.

In one embodiment, the memory controller 210 will record/update the physical addresses and logical addresses of write data to logical-to-physical mapping table T71.

In one embodiment, the memory controller 210 utilizes the characteristics of virtual blocks to record mapping relationships between virtual addresses (also referred to as virtual indices), logical addresses, and physical addresses of virtual blocks used to store write data through additionally generated logical-to-virtual mapping tables and virtual-to-physical mapping tables. It should be noted that virtual addresses refer to indices corresponding to each virtual block and virtual page in an abstract concept.

Figure 8:
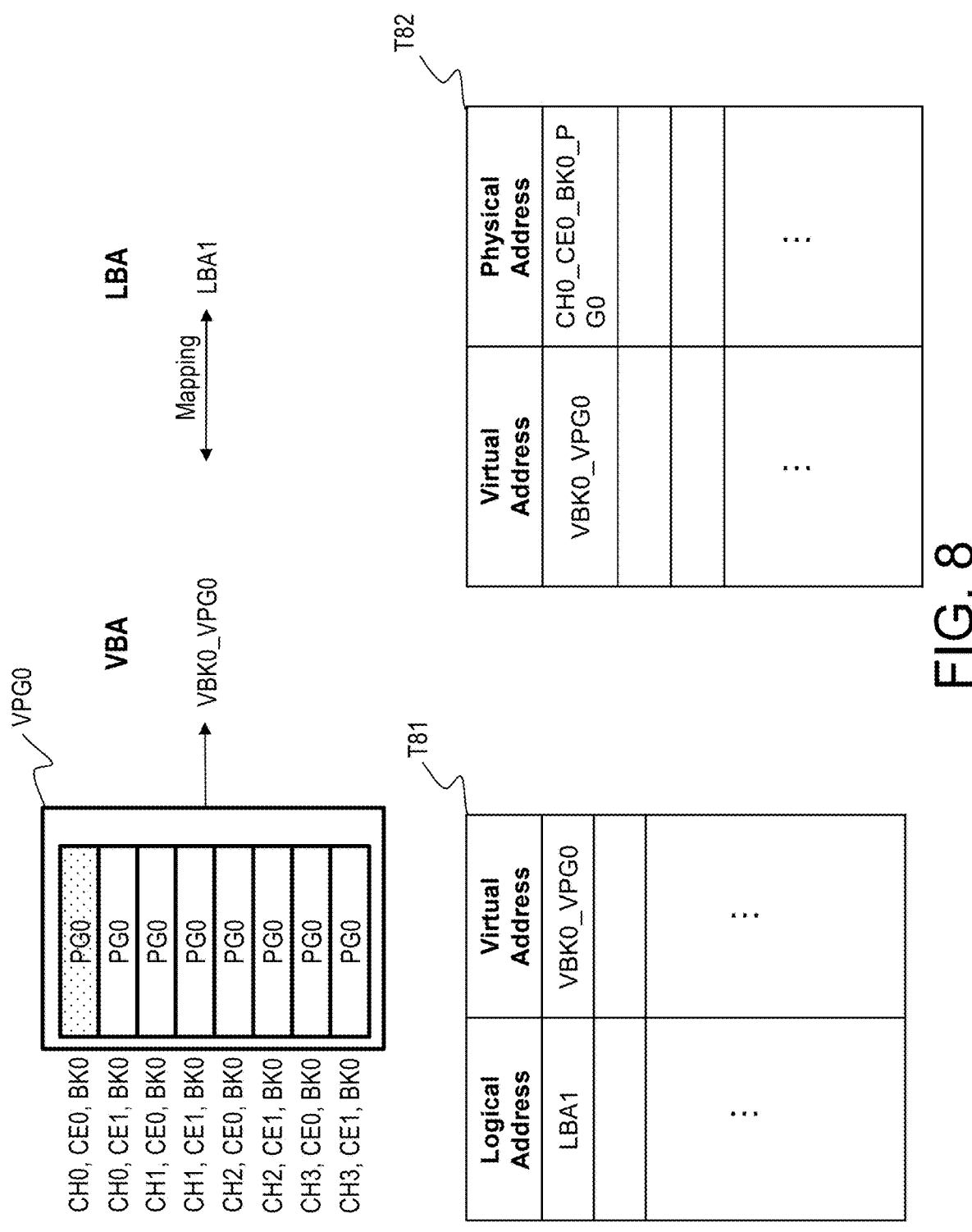
FIG. 8 is a diagram illustrating updating a logical-to-virtual mapping table and a virtual-to-physical mapping table according to virtual blocks according to an embodiment of the present invention.

FIG. 8 is a diagram illustrating updating a logical-to-virtual mapping table and a virtual-to-physical mapping table according to virtual blocks according to an embodiment of the present invention. Please refer to FIG. 8. In this embodiment, assume write data is stored in virtual page VPG0 of virtual block VBK0, the logical address (index) of the write data is LBA1, and the physical address (index) of the first physical page of virtual page VPG0 is "CH0_CE0_BK0_PG0". In this example, after storing write data to virtual page VPG0 of virtual block VBK0, the memory controller 210 will record/update the corresponding write data's logical address "LBA1" and virtual address "VBK0_VPG0" to logical-to-virtual mapping table T81, and record/update the corresponding write data's virtual address "VBK0_VPG0" and physical address "CH0_CE0_BK0_PG0" to virtual-to-physical mapping table T82. It should be noted that in this embodiment, information corresponding to the entire virtual page is used to record the virtual address of corresponding write data.

In this way, when the memory controller 210 executes a data read operation to read this data, the memory controller 210 can use logical-to-virtual mapping table T81 and virtual-to-physical mapping table T82 to read the data from physical address "CH0_CE0_BK0_PG0" of corresponding virtual page VPG02 based on logical address "LBA1".

It is worth mentioning that in other embodiments, the memory controller 210 uses sequence information corresponding to each physical page within a virtual page to record the virtual address of corresponding write data.

Figure 9:
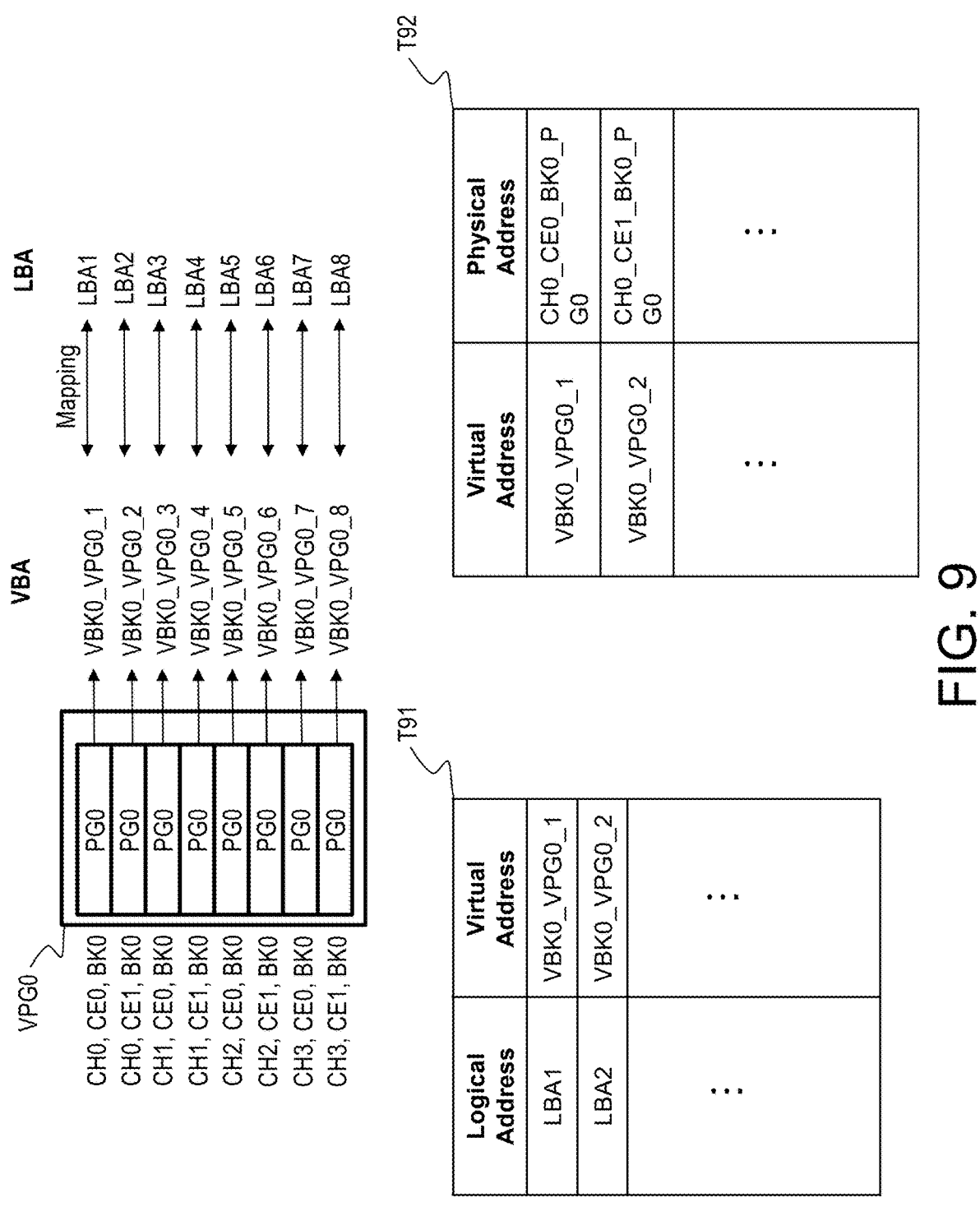
FIG. 9 is a diagram illustrating updating a logical-to-virtual mapping table and a virtual-to-physical mapping table according to virtual blocks according to another embodiment of the present invention.

FIG. 9 is a diagram illustrating updating a logical-to-virtual mapping table and a virtual-to-physical mapping table according to virtual blocks according to another embodiment of the present invention. For example, please refer to the upper part of FIG. 9, the memory controller 210 assigns a virtual address to each physical page based on the sequence of physical pages within virtual page VPG0. For example, the virtual address of physical page PG0 arranged first in virtual page VPG0 is set as "VBK0_VPG0_1".

Furthermore, assume multiple pieces of write data are stored in virtual page VPG0 of virtual block VBK0, with logical addresses "LBA1", "LBA2" . . . , and virtual addresses of virtual page VPG0 are "VBK0_VPG0_1", "VBK0_VPG0_1", . . . .

In this example, after storing multiple pieces of write data to virtual page VPG0 of virtual block VBK0, the memory controller 210 will record/update the corresponding write data's logical addresses "LBA1", "LBA2" . . . and virtual addresses "VBK0_VPG0_1", "VBK0_VPG0_1", . . . to logical-to-virtual mapping table T91, and record/update the corresponding multiple pieces of write data's virtual addresses "VBK0_VPG0_1", "VBK0_VPG0_1", . . . and physical addresses "CH0_CE0_BK0_PG0", "CH0_CE1_BK0_PG0", . . . to virtual-to-physical mapping table T92. It is worth mentioning that since the granularity of virtual addresses equals that of physical addresses, this embodiment achieves higher space utilization efficiency (compared to the example in FIG. 8).

For example, when the memory controller 210 executes a data read operation to read data stored at logical address "LBA2", the memory controller 210 can use logical-to-virtual mapping table T91 to find the corresponding virtual address "VBK0_VPG0_2". Then use virtual-to-physical mapping table T92 to find the corresponding physical address "CH0_CE1_BK0_PG0" based on virtual address "VBK0_VPG0_2" to read the data.

Please return to FIG. 2. After completing the first virtual block mapping operation, the memory controller 210 will determine whether the number of free physical blocks in each physical channel is lower than a predetermined threshold.

For example, in step S220, when the number of free physical blocks of a target physical channel (also referred to as a target channel pin) among the plurality of physical channels is lower than a predetermined threshold, dividing the plurality of physical channels into a first physical channel group and a second physical channel group, wherein the first physical channel group comprises at least the target physical channel.

Specifically, if the number of free physical blocks (total number of empty/available physical blocks) of the target physical channel among the plurality of physical channels is lower than the predetermined threshold, the memory controller 210 determines that the target physical channel needs to perform a garbage collection operation.

However, to avoid delaying the execution of garbage collection operations due to the rewritable non-volatile memory module 220 having to process data write commands from the host system 10.

In this embodiment, the memory controller 210 will group the multiple memory chips of the rewritable non-volatile memory module 220, letting one group execute garbage collection operations while another group remains in normal operation state to process data write commands from the host system. In this way, even when garbage collection operations are currently being executed on the first group of memory chips, when receiving a data write command from host system 10, the memory controller 210 can use the second group of memory chips to store write data corresponding to the received data write command. Furthermore, when the first group of memory chips completes garbage collection operations, it can switch to having the second group of memory chips execute garbage collection operations while using the first group of memory chips to process data write commands received from host system 10 to store write data corresponding to the received data write commands.

For example, in step S230, the memory controller 210 releases the first virtual block mapping operation performed on the plurality of physical blocks corresponding to the plurality of physical channels and each memory chip, performs a second virtual block mapping operation respectively on a plurality of first physical blocks corresponding to the first physical channel group and a plurality of second physical blocks corresponding to the second physical channel group, so as to obtain a plurality of first virtual blocks corresponding to the first physical channel group and a plurality of second virtual blocks corresponding to the second physical channel group. Then, in step S240, the memory controller 210 performs a garbage collection operation on the plurality of first virtual blocks corresponding to the first physical channel group, and performs a host write operation on the plurality of second virtual blocks corresponding to the second physical channel group.

More specifically, the memory controller 210 divides the plurality of physical channels into a first physical channel group and a second physical channel group, wherein the first physical channel group comprises the target physical channel corresponding to the target physical channel. The memory controller 210 will first perform garbage collection operations on the first physical channel group having the target physical channel. In one embodiment, the number of free physical blocks in each physical channel of the first physical channel group will be less than the number of free physical blocks in each physical channel of the second physical channel group.

If the first virtual block mapping operation performed on the plurality of physical blocks corresponding to the plurality of physical channels and chip enable pins has been completed, the memory controller 210 first releases the first virtual block mapping operation (e.g., not using the obtained multiple virtual blocks for data access).

Then, the memory controller 210 performs a second virtual block mapping operation respectively on a plurality of first physical blocks corresponding to the first physical channel group and a plurality of second physical blocks corresponding to the second physical channel group, so as to obtain a plurality of first virtual blocks corresponding to the first physical channel group and a plurality of second virtual blocks corresponding to the second physical channel group. In one embodiment, performing the second virtual block mapping operation respectively on the plurality of first physical blocks corresponding to the first physical channel group and the plurality of second physical blocks corresponding to the second physical channel group comprises: grouping the plurality of first physical blocks into the plurality of first virtual blocks corresponding to the first physical channel group according to at least one second physical channel within the first physical channel group, multiple first chip enable pins corresponding to each second physical channel, and respective first physical block numbers of the multiple first physical blocks corresponding to each first chip enable pin; and regrouping the multiple first physical pages into multiple first virtual pages of the corresponding first virtual block according to respective first physical page numbers of multiple first physical pages within each first virtual block; grouping the plurality of second physical blocks into the plurality of second virtual blocks corresponding to the second physical channel group according to at least one second physical channel within the second physical channel group, multiple second chip enable pins corresponding to each second physical channel, and respective second physical block numbers of multiple second physical blocks corresponding to each second chip enable pin; and regrouping the multiple second physical pages into multiple second virtual pages of the corresponding second virtual block according to respective second physical page numbers of multiple second physical pages within each second virtual block.

Then, the processor locks the plurality of first virtual blocks corresponding to the first physical channel group to perform garbage collection operations on the plurality of first virtual blocks, while the plurality of second virtual blocks corresponding to the second physical channel group maintains normal operation.

In this way, the bandwidth of four channels can be fully utilized, improving the efficiency of dirty disk usage while avoiding conflicts between host data writing and garbage collection operations.

In one embodiment, performing the second virtual block mapping operation respectively on the plurality of first physical blocks corresponding to the first physical channel group and the plurality of second physical blocks corresponding to the second physical channel group comprises: performing a virtual block mapping operation on second-type physical blocks among the plurality of first physical blocks corresponding to the first physical channel group, wherein the second-type physical blocks are of a X-level cell type; and performing a virtual block mapping operation on first-type physical blocks among the plurality of second physical blocks corresponding to the second physical channel group, wherein the first-type physical blocks are of a single-level cell type.

In other words, for the physical channel group used to handle host write operations, the memory controller 210 will select single-level cell type physical blocks to perform virtual block mapping operations; for the physical channel group used to handle garbage collection operations, the memory controller 210 will select X-level cell type physical blocks to perform virtual block mapping operations. The reason is that, to efficiently handle host write operations, the fastest virtual blocks corresponding to multiple single-level cell type physical blocks will be used for data writing; to efficiently handle host write operations, virtual blocks corresponding to multiple X-level cell type physical blocks containing more invalid data will be used to perform data movement through multi-plane read/write mechanisms.

Figure 10:
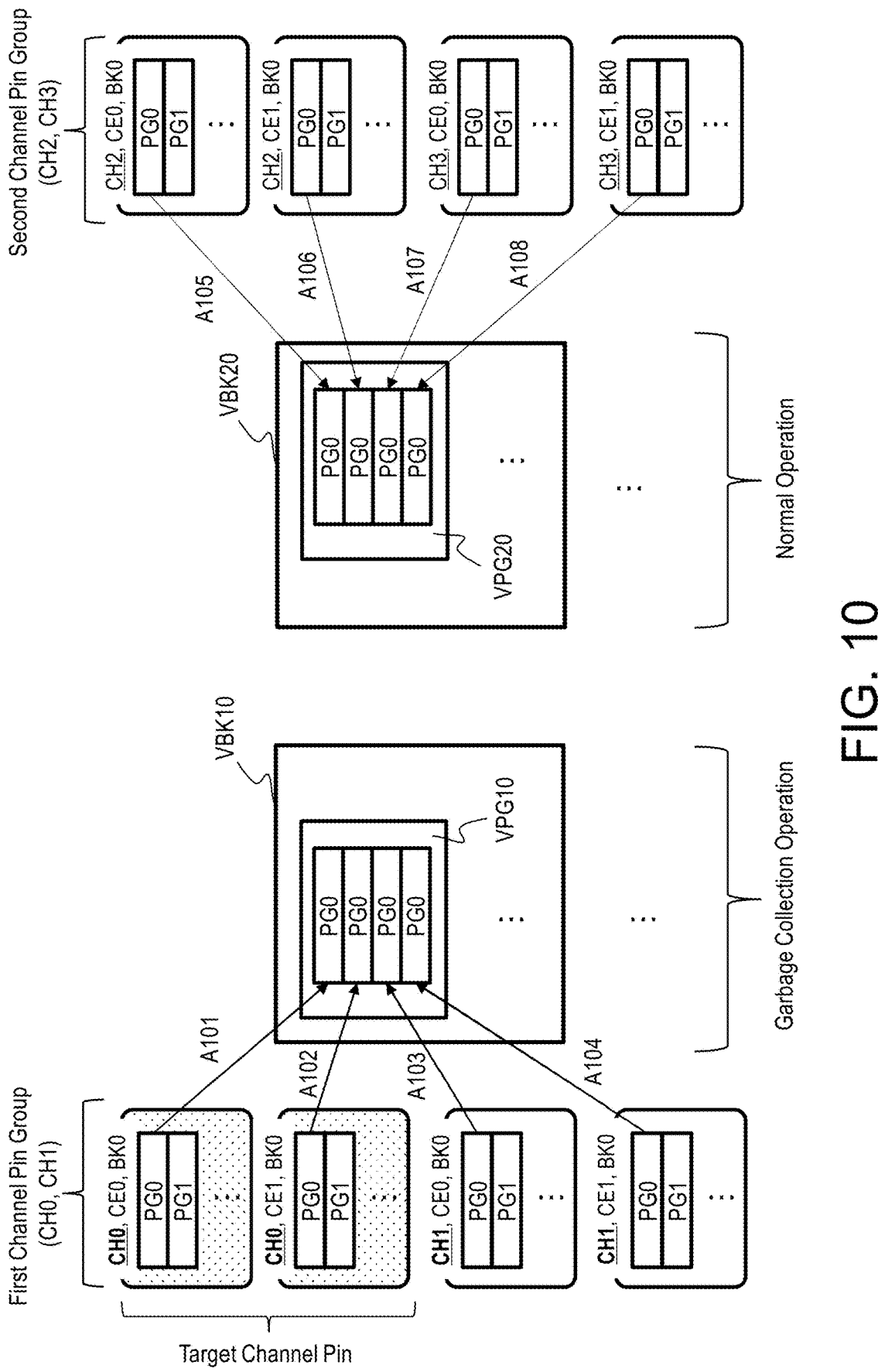
FIG. 10 is a diagram illustrating performing virtual block mapping operations respectively based on garbage collection operation and normal operation according to an embodiment of the present invention.

FIG. 10 is a diagram illustrating performing virtual block mapping operations respectively based on garbage collection operation and normal operation according to an embodiment of the present invention. Please refer to FIGS. 3 and 10. For example, based on the architecture in FIG. 3, assuming the target physical channel that needs to perform garbage collection operations is located in memory chip DI00, which corresponds to CH pin CH0 and CE pin CE0. The memory controller 210 groups CH pins CH0, CH1 into a first CH pin group to perform garbage collection operations; groups CH pins CH2, CH3 into a second CH pin group to maintain normal operation.

Then, the memory controller 210 performs the second virtual block mapping operation respectively on the first CH pin group and the second CH pin group. The difference between the second virtual block mapping operation and the first virtual block mapping operation is that the second virtual block mapping operation constructs virtual blocks separately for physical blocks belonging to each group.

For example, as shown by arrows A101-A104, the memory controller 210 performs the second virtual block mapping operation on the first physical channel group (first channel pin group): the memory controller 210 first selects the first physical page PG0 of physical block BK0 corresponding to CH0 and CE0; the first physical page PG0 of physical block BK0 corresponding to CH0 and CE1; the first physical page PG0 of physical block BK0 corresponding to CH1 and CE0; the first physical page PG0 of physical block BK0 corresponding to CH1 and CE1, grouping the selected 4 physical pages into the first virtual page VPG10 of virtual block VBK10 corresponding to the first CH pin group. Similarly, multiple virtual blocks corresponding to the first CH pin group can be obtained to perform garbage collection operations on data stored in the virtual blocks corresponding to the first CH pin group.

At this time, the memory controller 210 will perform garbage collection operations on the first CH pin group (garbage collection group) in units of virtual blocks, reading valid data from multiple source virtual blocks within the first CH pin group, and writing it to empty (available) virtual blocks within the first CH pin group.

On the other hand, as shown by arrows A105~A108, the memory controller 210 performs the second virtual block mapping operation on the second physical channel group (second channel pin group): the memory controller 210 selects the first physical page PG0 of physical block BK0 corresponding to CH2 and CE0; the first physical page PG0 of physical block BK0 corresponding to CH2 and CE1; the first physical page PG0 of physical block BK0 corresponding to CH3 and CE0; the first physical page PG0 of physical block BK0 corresponding to CH3 and CE1, grouping the selected 4 physical pages into the first virtual page VPG20 of virtual block VBK20 corresponding to the second CH pin group. Similarly, multiple virtual blocks corresponding to the second CH pin group can be obtained to allow write commands from the host system to be executed normally.

In other words, during performing the garbage collection operation on the plurality of first physical blocks corresponding to the first physical channel group, if another write command is received from the host system 10, the memory controller 210 performs another write operation to select one or more target second virtual blocks from the plurality of second virtual blocks to store another write data corresponding to the another write command. For example, during the garbage collection operation on virtual block VBK10, the memory controller 210 can still select empty (available) virtual block VBK20 to store another write data without needing to stop the executing garbage collection operation.

After storing the another write data, the memory controller 210 records address mapping information based on the physical addresses of one or more target second virtual pages of the one or more target second virtual blocks used to store the another write data corresponding to the another write command and logical addresses corresponding to the another write data. The methods for recording address mapping information have been detailed above and will not be repeated here.

In one embodiment, after completion of the garbage collection operation on the plurality of first physical blocks corresponding to the first physical channel group, the memory controller 210 may release the second virtual block mapping operation corresponding to the first physical channel group and second physical channel group, and restore the first virtual block mapping operation, so that all physical channels can be used to execute host system write operations.

In one embodiment, after completion of the garbage collection operation on the plurality of first physical blocks corresponding to the first physical channel group, the memory controller 210 may also restore normal operation of the first physical channel group that has completed garbage collection operations, ready to execute host write operations.

For example, performing another host write operation on the plurality of first virtual blocks of the first physical channel group comprises: performing a virtual block mapping operation on first-type physical blocks among the plurality of first physical blocks corresponding to the first physical channel group to obtain the plurality of first virtual blocks, thereby performing the another host write operation on the plurality of first virtual blocks, wherein the first-type physical blocks are of a single-level cell type.

In one embodiment, after completion of the garbage collection operation on the plurality of first physical blocks corresponding to the first physical channel group, the memory controller 210 may also perform garbage collection operations on the second physical channel group. Specifically, the memory controller 210 restores normal operation of the plurality of first physical blocks corresponding to the first physical channel group; and the memory controller 210 performs another garbage collection operation on the plurality of second virtual blocks of the second physical channel group.

For example, performing the another garbage collection operation on the plurality of second virtual blocks of the second physical channel group comprises: performing a virtual block mapping operation on second-type physical blocks among the plurality of second physical blocks corresponding to the second physical channel group to obtain the plurality of second virtual blocks, thereby performing the another garbage collection operation on the plurality of second virtual blocks, wherein the second-type physical blocks are of a X-level cell type.

In one embodiment, after completion of the another garbage collection operation on the plurality of second physical blocks corresponding to the second physical channel group, the memory controller 210 restores normal operation of the plurality of second physical blocks corresponding to the second physical channel group, releases the second virtual block mapping operation, and restores the first virtual block mapping operation.

In one embodiment, during performing the first virtual block mapping operation on first-type physical blocks among the plurality of physical blocks, the memory controller 210 respectively selects predetermined physical blocks from each physical channel to perform a third virtual block mapping operation, so as to group multiple predetermined physical blocks into multiple predetermined virtual blocks, which are used to store system data.

Since system data has a smaller volume, although binding across all CH pins and CE pins (e.g., the first virtual block mapping operation) improves transmission efficiency, it reduces storage utilization and wastes storage space. Therefore, in this embodiment, the memory controller 210 will use physical blocks in a specific range for binding, specifically used to store system data.

Specifically, the memory controller 210 performs a third virtual block mapping operation on multiple predetermined physical blocks corresponding to predetermined chip enable pins among the plurality of physical channels and the plurality of chip enable pins, so as to group the plurality of predetermined physical blocks into multiple predetermined virtual blocks, wherein the plurality of predetermined virtual blocks are used to store system data.

When executing system data storage instruction sequences, the processor executes a system data write operation to select one or more target predetermined virtual blocks from the plurality of predetermined virtual blocks, and stores system data corresponding to the system data storage instruction sequences into the selected one or more target predetermined virtual blocks, wherein the system data is not user data from the host system.

Figure 11:
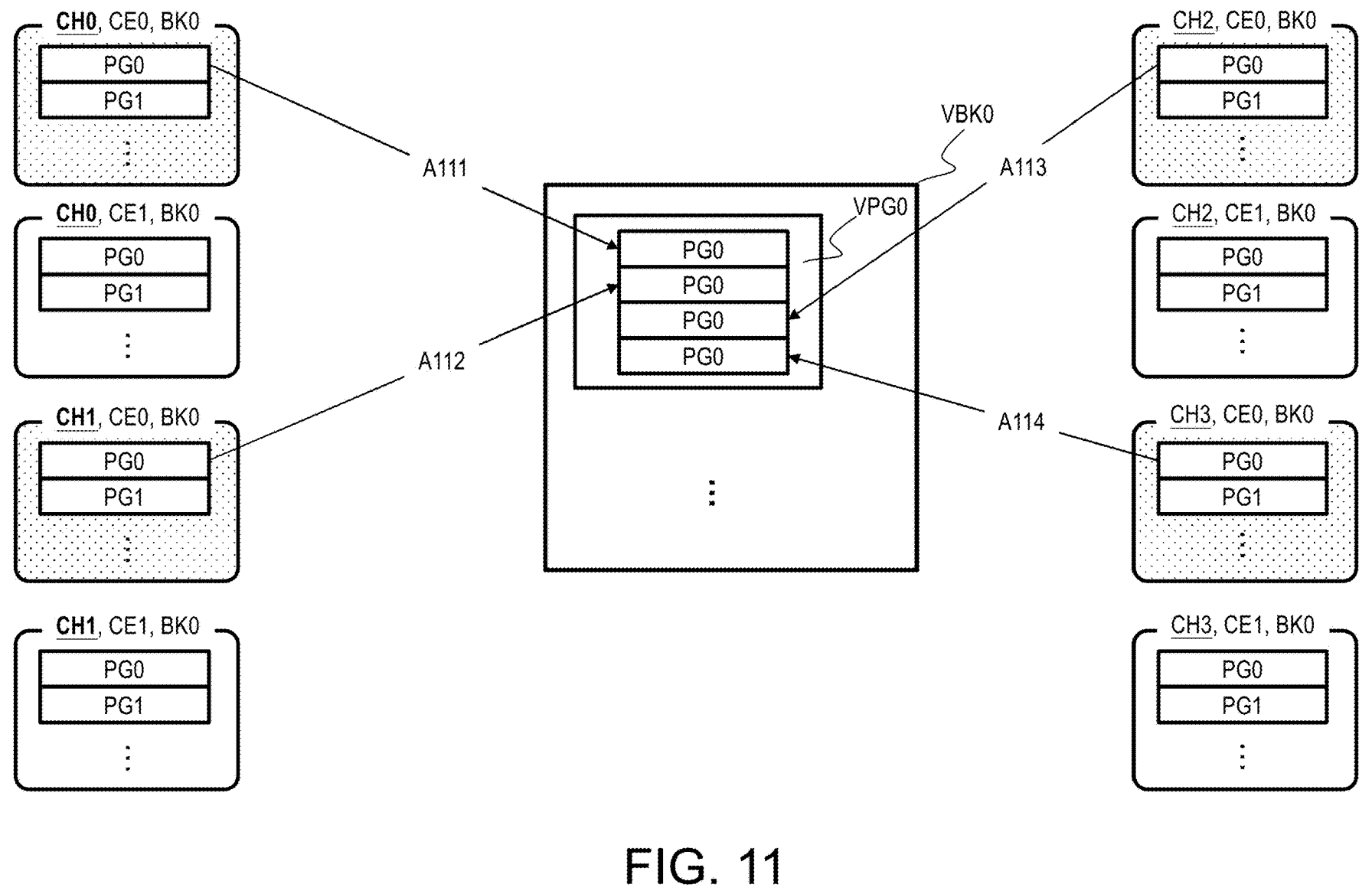

In one embodiment, the plurality of predetermined physical blocks are of a X-level cell FIG. 11 is a diagram illustrating performing virtual block mapping operations respectively based on system data storage requirements according to an embodiment of the present invention. For example, please refer to FIG. 11. In this embodiment, assume the memory controller 210 sets the first CE pin CE0 of each CH pin as the predetermined chip enable pin. Multiple physical blocks configured in the predetermined chip enable pin CE0 serve as predetermined physical blocks. For example, as shown by arrows A111-A114, physical page PG0 corresponding to CH0, CE0, BK0 is grouped into virtual page VPG0 of predetermined virtual block VBK0; physical page PG0 corresponding to CH1, CE0, BK0 is grouped into virtual page VPG0 of predetermined virtual block VBK0; physical page PG0 corresponding to CH2, CE0, BK0 is grouped into virtual page VPG0 of predetermined virtual block VBK0; physical page PG0 corresponding to CH3, CE0, BK0 is grouped into virtual page VPG0 of predetermined virtual block VBK0. Similarly, through the third virtual block mapping operation, the memory controller 210 obtains multiple predetermined virtual blocks to store system data into these predetermined virtual blocks.

In this way, although the number of predetermined virtual blocks obtained through the third virtual block mapping operation is less than that of the first virtual block mapping operation, it is sufficient for system data of smaller size to use. The system data may include any type of non-user data used to manage the operation of the storage device. For example, various address mapping tables, bad block tables for garbage collection operations, trim tables, etc.

Based on the above, the memory controller, storage device and memory management method provided by the embodiments of the present invention can utilize grouping and binding of multiple physical blocks to obtain multiple groups of virtual blocks, allowing the storage device to simultaneously perform garbage collection operations and host user data write operations by groups, avoiding the drawback of traditional garbage collection operations having to avoid host user data write operations, improving the flexibility and efficiency of garbage collection operations, thereby enhancing the operational efficiency of the storage device and improving user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A memory management method, adapted for a rewritable non-volatile memory module, wherein the rewritable non-volatile memory module comprises a plurality of memory chips and a plurality of corresponding physical channels, wherein each of the memory chips comprises a plurality of physical blocks, wherein the plurality of physical blocks are sequentially arranged according to numbers, wherein the method comprises:

performing a first virtual block mapping operation on the plurality of physical blocks corresponding to the plurality of memory chips of the plurality of physical channels, so as to obtain a plurality of virtual blocks to execute a first host write operation;

determining that a number of free physical blocks of a target physical channel among the plurality of physical channels is lower than a predetermined threshold;

responsive to determining that the number of free physical blocks of the target physical channel is lower than the predetermined threshold, dividing the plurality of physical channels into a first physical channel group and a second physical channel group, wherein the first physical channel group comprises at least the target physical channel;

releasing the first virtual block mapping operation, performing a second virtual block mapping operation respectively on the first physical channel group and the second physical channel group, so as to obtain a plurality of first virtual blocks corresponding to the first physical channel group and a plurality of second virtual blocks corresponding to the second physical channel group;

performing a garbage collection operation on the plurality of first virtual blocks corresponding to the first physical channel group, and performing a second host write operation on the plurality of second virtual blocks corresponding to the second physical channel group.

2. The memory management method according to claim 1, wherein performing the first virtual block mapping operation on the plurality of physical blocks corresponding to the plurality of memory chips of the plurality of physical channels comprises: performing a virtual block mapping operation on a plurality of first-type physical blocks among the plurality of physical blocks, wherein the plurality of first-type physical blocks are of a single-level cell type.

3. The memory management method according to claim 2, wherein obtaining the plurality of virtual blocks to execute the first host write operation comprises:

selecting a target virtual block from the plurality of virtual blocks to store write data corresponding to a write command;

recording address mapping information according to a physical address of a target virtual page of the target virtual block and a logical address corresponding to the write data, wherein the write command indicates the logical address, and the write data is stored in the target virtual page.

4. The memory management method according to claim 2, wherein during performing the first virtual block mapping operation on first-type physical blocks among the plurality of physical blocks, the method further comprises:

selecting predetermined physical blocks respectively from each physical channel to perform a third virtual block mapping operation, so as to group a plurality of predetermined physical blocks into a plurality of predetermined virtual blocks, wherein the plurality of predetermined physical blocks are of a X-level cell type;

when executing a system data storage instruction sequence, selecting a target predetermined virtual block from the plurality of predetermined virtual blocks, and storing system data into the selected target predetermined virtual block, wherein the system data is not user data from a host system.

5. The memory management method according to claim 4, wherein each of the memory chips comprises a plurality of planes, the method further comprises: writing data to each virtual block via a multi-plane write mechanism, and reading data from each virtual block via a multi-plane read mechanism.

6. The memory management method according to claim 1, wherein performing the second virtual block mapping operation respectively on the first physical channel group and the second physical channel group comprises:

performing a virtual block mapping operation on second-type physical blocks corresponding to the first physical channel group, wherein the second-type physical blocks are of a X-level cell type;

performing a virtual block mapping operation on first-type physical blocks corresponding to the second physical channel group, wherein the first-type physical blocks are of a single-level cell type.

7. The memory management method according to claim 6, wherein during performing the garbage collection operation on a plurality of first physical blocks corresponding to the first physical channel group:

if another write command is received, selecting a target second virtual block from the plurality of second virtual blocks to store another write data corresponding to the another write command;

recording address mapping information according to a physical address of a target second virtual page of the target second virtual block and a logical address corresponding to the another write data, wherein the write command indicates the logical address, and the another write data is stored in the target second virtual page.

8. The memory management method according to claim 1, wherein after completion of the garbage collection operation on the plurality of first physical blocks corresponding to the first physical channel group, the method further comprises:

restoring normal operation of the first physical channel group and performing another host write operation on the plurality of first virtual blocks of the first physical channel group;

performing another garbage collection operation on the plurality of second virtual blocks of the second physical channel group;

wherein after completion of the another garbage collection operation on the second physical channel group, restoring normal operation of the second physical channel group, releasing the second virtual block mapping operation, and restoring the first virtual block mapping operation.

9. The memory management method according to claim 8, wherein performing the another host write operation on the plurality of first virtual blocks of the first physical channel group comprises:

performing a virtual block mapping operation on first-type physical blocks corresponding to the first physical channel group, so as to obtain the plurality of first virtual blocks to execute a host write operation, wherein the first-type physical blocks are of a single-level cell type;

performing the another garbage collection operation on the plurality of second virtual blocks of the second physical channel group comprises:

performing a virtual block mapping operation on second-type physical blocks corresponding to the second physical channel group, so as to obtain the plurality of second virtual blocks to execute a garbage collection operation, wherein the second-type physical blocks are of a X-level cell type.

10. The memory management method according to claim 1, wherein the second virtual block mapping operation comprises:

grouping the plurality of physical blocks having same numbers into a same virtual block according to the plurality of physical channels and respective physical block numbers of the plurality of physical blocks;

grouping a plurality of physical pages having same numbers into a same virtual page of a corresponding virtual block according to respective physical page numbers of the plurality of physical blocks of each virtual block.

11. A memory controller for controlling a storage device configured with a rewritable non-volatile memory module, wherein the memory controller comprises:

a memory interface control circuit, electrically connected to the rewritable non-volatile memory module, wherein the rewritable non-volatile memory module comprises a plurality of memory chips and a plurality of corresponding physical channels, wherein each of the memory chips comprises a plurality of physical blocks, wherein the plurality of physical blocks are sequentially arranged according to numbers;

a processor, electrically connected to the memory interface control circuit and a connection interface circuit of the storage device;

wherein the processor is configured to:

perform a first virtual block mapping operation on the plurality of physical blocks corresponding to the plurality of memory chips of the plurality of physical channels, so as to obtain a plurality of virtual blocks to execute a first host write operation;

when a number of free physical blocks of a target physical channel among the plurality of physical channels is lower than a predetermined threshold, divide the plurality of physical channels into a first physical channel group and a second physical channel group, wherein the first physical channel group comprises at least the target physical channel;

release the first virtual block mapping operation, perform a second virtual block mapping operation respectively on the first physical channel group and the second physical channel group, so as to obtain a plurality of first virtual blocks corresponding to the first physical channel group and a plurality of second virtual blocks corresponding to the second physical channel group;

perform a garbage collection operation on the plurality of first virtual blocks corresponding to the first physical channel group, and perform a second host write operation on the plurality of second virtual blocks corresponding to the second physical channel group.

12. The memory controller according to claim 11, wherein performing the first virtual block mapping operation on the plurality of physical blocks corresponding to the plurality of memory chips of the plurality of physical channels comprises: the processor performing a virtual block mapping operation on a plurality of first-type physical blocks among the plurality of physical blocks, wherein the plurality of first-type physical blocks are of a single-level cell type.

13. The memory controller according to claim 12, wherein obtaining the plurality of virtual blocks to execute the first host write operation comprises:

the processor selecting a target virtual block from the plurality of virtual blocks to store write data corresponding to a write command;

the processor recording address mapping information according to a physical address of a target virtual page of the target virtual block and a logical address corresponding to the write data, wherein the write command indicates the logical address, and the write data is stored in the target virtual page.

14. The memory controller according to claim 12, wherein during performing the first virtual block mapping operation on first-type physical blocks among the plurality of physical blocks:

selecting predetermined physical blocks respectively from each physical channel to perform a third virtual block mapping operation, so as to group a plurality of predetermined physical blocks into a plurality of predetermined virtual blocks, wherein the plurality of predetermined physical blocks are of a X-level cell type;

when executing a system data storage instruction sequence, selecting a target predetermined virtual block from the plurality of predetermined virtual blocks, and storing system data into the selected target predetermined virtual block, wherein the system data is not user data from a host system.

15. The memory controller according to claim 14, wherein each of the memory chips comprises a plurality of planes, and the processor writes data to each virtual block via a multi-plane write mechanism, and reads data from each virtual block via a multi-plane read mechanism.

16. The memory controller according to claim 11, wherein performing the second virtual block mapping operation respectively on the first physical channel group and the second physical channel group comprises:

the processor performing a virtual block mapping operation on second-type physical blocks corresponding to the first physical channel group, wherein the second-type physical blocks are of a X-level cell type;

the processor performing a virtual block mapping operation on first-type physical blocks corresponding to the second physical channel group, wherein the first-type physical blocks are of a single-level cell type.

17. The memory controller according to claim 16, wherein during performing the garbage collection operation on a plurality of first physical blocks corresponding to the first physical channel group:

if another write command is received, the processor selecting a target second virtual block from the plurality of second virtual blocks to store another write data corresponding to the another write command;

the processor recording address mapping information according to a physical address of a target second virtual page of the target second virtual block and a logical address corresponding to the another write data, wherein the write command indicates the logical address, and the another write data is stored in the target second virtual page.

18. The memory controller according to claim 11, wherein after completion of the garbage collection operation on the plurality of first physical blocks corresponding to the first physical channel group, the processor is further configured to:

restore normal operation of the first physical channel group and perform another host write operation on the plurality of first virtual blocks of the first physical channel group;

perform another garbage collection operation on the plurality of second virtual blocks of the second physical channel group;

wherein after completion of the another garbage collection operation on the second physical channel group, restore normal operation of the second physical channel group, release the second virtual block mapping operation, and restore the first virtual block mapping operation.

19. The memory controller according to claim 18, wherein performing the another host write operation on the plurality of first virtual blocks of the first physical channel group comprises:

the processor performing a virtual block mapping operation on first-type physical blocks corresponding to the first physical channel group, so as to obtain the plurality of first virtual blocks to execute a host write operation, wherein the first-type physical blocks are of a single-level cell type;

performing the another garbage collection operation on the plurality of second virtual blocks of the second physical channel group comprises:

the processor performing a virtual block mapping operation on second-type physical blocks corresponding to the second physical channel group, so as to obtain the plurality of second virtual blocks to execute a garbage collection operation, wherein the second-type physical blocks are of a X-level cell type.

20. The memory controller according to claim 11, wherein the second virtual block mapping operation comprises:

the processor grouping the plurality of physical blocks having same numbers into a same virtual block according to the plurality of physical channels and respective physical block numbers of the plurality of physical blocks;

the processor grouping a plurality of physical pages having same numbers into a same virtual page of a corresponding virtual block according to respective physical page numbers of the plurality of physical blocks of each virtual block.

* * * * *